(12) United States Patent
Park et al.

(10) Patent No.: US 12,117,845 B2
(45) Date of Patent: Oct. 15, 2024

(54) METHOD AND CLOUD SERVER FOR CONTROLLING ROBOT PROVIDING SERVICE IN CONNECTION WITH SERVICE APPLICATION

(71) Applicant: NAVER LABS CORPORATION, Seongnam-si (KR)

(72) Inventors: Kay Park, Seongnam-si (KR); Younghwan Yoon, Seongnam-si (KR); Seung In Cha, Seongnam-si (KR); Wooyoung Choi, Seongnam-si (KR)

(73) Assignee: NAVER LABS CORPORATION, Gyeonggi-do (KR)

( * ) Notice: Subject to any disclaimer, the term of this patent is extended or adjusted under 35 U.S.C. 154(b) by 49 days.

(21) Appl. No.: 17/514,499

(22) Filed: Oct. 29, 2021

(65) Prior Publication Data
US 2022/0171392 A1    Jun. 2, 2022

(30) Foreign Application Priority Data

Nov. 30, 2020  (KR) ................ 10-2020-0163830

(51) Int. Cl.
*G05D 1/00*    (2024.01)
*B60L 53/36*   (2019.01)
*G06Q 50/10*   (2012.01)

(52) U.S. Cl.
CPC .......... *G05D 1/028* (2013.01); *G05D 1/0022* (2013.01); *G05D 1/0217* (2013.01); *G06Q 50/10* (2013.01); *B60L 53/36* (2019.02)

(58) Field of Classification Search
CPC .... G05D 1/028; G05D 1/0022; G05D 1/0217; G05D 1/0088; G05D 1/021; G06Q 50/10; B60L 53/36; G05B 19/0405; B25J 9/1664; B25J 13/006
See application file for complete search history.

(56) References Cited

U.S. PATENT DOCUMENTS

| | | | |
|---|---|---|---|
| 8,307,061 B1 * | 11/2012 | Hickman ................. | B25J 9/161 709/200 |
| 2006/0161300 A1 | 7/2006 | Gonzalez-Banos et al. | |
| 2012/0197439 A1 * | 8/2012 | Wang .................... | G05D 1/0038 901/1 |
| 2018/0056505 A1 * | 3/2018 | Kuffner ................. | B25J 9/0084 |
| 2021/0146547 A1 * | 5/2021 | Jae ......................... | G06Q 50/10 |

FOREIGN PATENT DOCUMENTS

| | | |
|---|---|---|
| JP | H06175722 A | 6/1994 |
| JP | 2001-142534 A | 5/2001 |
| JP | 2013-99800 A | 5/2013 |

(Continued)

*Primary Examiner* — Anne Marie Antonucci
*Assistant Examiner* — Jewel Ashley Kuntz
(74) *Attorney, Agent, or Firm* — Harness, Dickey & Pierce, P.L.C.

(57) ABSTRACT

A method of operating a cloud server to control a robot providing a service in connection with a service application includes receiving an instruction to provide the service from the service application; and based on the received instruction, generating a plurality of sub-instructions by specifying the received instruction; and transmitting each sub-instruction, from among the plurality of sub-instructions, to the robot, wherein the transmitted sub-instructions are instructions for controlling the robot.

18 Claims, 11 Drawing Sheets

(56) References Cited

FOREIGN PATENT DOCUMENTS

| | | |
|---|---|---|
| JP | 2017-010518 A | 1/2017 |
| JP | 2017-196691 A | 11/2017 |
| JP | 2019-534516 A | 11/2019 |
| KR | 10-2001-0003307 A | 1/2001 |
| KR | 10-2005-0024840 A | 3/2005 |
| KR | 10-2067770 B1 | 1/2020 |
| WO | WO-2020081646 A2 * | 4/2020 ........... G05D 1/0231 |

* cited by examiner

METHOD AND CLOUD SERVER FOR CONTROLLING ROBOT PROVIDING SERVICE IN CONNECTION WITH SERVICE APPLICATION

CROSS-REFERENCE TO RELATED APPLICATION(S)

This U.S. non-provisional application and claims the benefit of priority under 35 U.S.C. § 365(c) to Korean Patent Application No. 10-2020-0163830, filed Nov. 30, 2020, the entire contents of which are incorporated herein by reference in their entirety.

BACKGROUND

1. Field

One or more example embodiments relate to a method and a cloud server for controlling a robot providing a service in connection with a service application.

2. Related Art

An autonomous driving robot refers to a robot that finds an desired or, alternatively, optimal path to a destination using wheels or legs, looking around and detecting obstacles by itself. Also, the autonomous driving robot is being developed and used as a robot that provides a corresponding service in various fields, such as an autonomous driving vehicle, logistics, a hotel service, and a cleaning service.

For example, Korean Patent Laid-Open Publication No. 10-2005-0024840 refers to technology for a path planning method for an autonomously moving robot and describes a method of planning a desired or, alternatively, optimal path for a mobile robot autonomously moving at home or office to safely and quickly move to a target point while avoiding obstacles.

The aforementioned information is provided to assist understanding only and may contain content that does not form a portion of the related art.

SUMMARY

One or more example embodiments provide a robot control method that may generate a plurality of sub-instructions by specifying an abstracted instruction received from a service application and may transmit the specified sub-instruction to a robot to control the robot, as a method of controlling the robot providing a service in connection with the service application, which is performed by a cloud server.

One or more example embodiments provide a robot control method that may generate abstracted data by analyzing data received from a robot and may transmit the abstracted data to a service application, such that an instruction to control the robot or monitoring information about the robot may be generated in a service application.

According to at least some example embodiments, a method of operating a cloud server to control a robot providing a service in connection with a service application includes receiving an instruction to provide the service from the service application; and based on the received instruction, generating a plurality of sub-instructions by specifying the received instruction; and transmitting each sub-instruction, from among the plurality of sub-instructions, to the robot, wherein the transmitted sub-instructions are instructions for controlling the robot.

The method may further include determining whether the received instruction is a bypass target instruction, wherein the generating of the plurality of sub-instructions is performed when the received instruction is not the bypass target instruction.

The method may further include immediately transferring the received instruction to the robot, when the received instruction is the bypass target instruction, wherein the robot is controlled based on the transferred instruction.

The bypass target instruction may be an instruction to control a user experience (UX)-related component of the robot.

Each sub-instruction may be a unit instruction executable by the robot, and the generating of the plurality of sub-instructions may include generating the plurality of sub-instructions by dividing the received instruction into a plurality of unit instructions.

The received instruction may be an instruction to move the robot to a destination, and the generating of the plurality of sub-instructions may include determining a plurality of waypoints through which the robot is to move from a current position of the robot to the destination; and transmitting an instruction to move the robot to each waypoint of the waypoints to the robot as each corresponding sub-instruction, and the sub-instructions may cause the robot to move to the destination by moving through the plurality of waypoints.

The transmitting of each sub-instruction, from among the plurality of sub-instructions, may include sequentially transmitting each sub-instruction, and may include transmitting a first sub-instruction among the plurality of sub-instructions to the robot; receiving a completion report from the robot after control of the robot according to the first sub-instruction is completed; and transmitting a second sub-instruction successive to the first sub-instruction among the plurality of sub-instructions to the robot after receiving the completion report.

The transmitting of each sub-instruction, from among the plurality of sub-instructions, may include monitoring a state of the robot; and transmitting, to the robot, a sub-instruction for providing the service by the robot among the sub-instructions or transmitting, to the robot, a cancellation instruction to cancel a previously transmitted sub-instruction, depending on the state of the robot.

The method may further include receiving, from the robot, data that is collected by the robot; analyzing the received data and generating abstracted data; and transmitting the abstracted data to the service application, wherein, based on the abstracted data, an instruction to control the robot is generated by the service application or monitoring information about the robot is generated by the service application.

The method may include determining whether the received data includes bypass target data; and immediately transferring the bypass target data in the received data to the service application, wherein the bypass target data includes data that indicates a first state of the robot.

The generating of the abstracted data may include analyzing the received data and determining whether the robot is in a second state; and transmitting, to the service application, information regarding whether the robot is in the second state as the abstracted data, based on a result of the determining.

The robot may be a first robot, and the method may further include generating an independence instruction to control the first robot independently from the received instruction; and transmitting the independence instruction to the first robot or a second robot, wherein the independence instruction includes an instruction to require charging for the first robot, an instruction to update a travel path of the first robot to a specific point, or an instruction to request the second robot to provide the service when the first robot is unable to provide the service.

The service application may be implemented on a server or a client separate from the robot through a network, the received instruction may be an abstracted instruction incapable of directly controlling the robot to provide the service, each sub-instruction, from among the plurality of sub-instructions, may be an instruction that is capable of directly controlling the robot, and each sub-instruction, from among the plurality of sub-instructions, that is transmitted to the robot may not include context information related to the service.

The service application may be a first service application from among a plurality of service applications, wherein, the first service application may be an application that, when plugged into the robot, configures the robot to provide the service in connection with the first service application, and wherein the cloud server may allow a second service application, from among the plurality of service applications, to be plugged into the robot and controls the robot to provide another service in connection with the second service application.

The method may further include setting different security policies for the service application, the cloud server, and the robot.

According to at least some example embodiments, a method of controlling a robot providing a service in connection with a cloud server and a service application includes receiving, from the cloud server, a plurality of sub-instructions that were generated by specifying an instruction to provide the service that was transmitted from the service application to the cloud server; and controlling the robot based on each of the received plurality of sub-instructions, wherein the service application is implemented on a server or a client separate from the robot through a network, wherein the instruction to provide the service is an abstracted instruction incapable of directly controlling the robot to provide the service, wherein each sub-instruction, from among the plurality of sub-instructions, is an instruction that is capable of directly controlling the robot, and wherein each sub-instruction, from among the plurality of sub-instructions, that is transmitted to the robot does not include context information related to the service.

The method may further include collecting data related to control of the robot; and transmitting the collected data to the cloud server, wherein the data transmitted to the cloud server is analyzed by the cloud server and processed as abstracted data and transmitted to the service application, and based on the abstracted data, an instruction to control the robot is generated by the service application or information indicating monitoring information about the robot is generated by the service application.

The service application may be a first service application from among a plurality of service applications, the first service application may be an application that, when plugged into the robot, configures the robot to provide the service in connection with the first service application, and the plurality of service applications may include a second service application, different from the first service application, that, when plugged into the robot by the cloud server, controls the robot to provide another service in connection with the second service application.

According to at least some example embodiments, a cloud server to control a robot providing a service in connection with a service application may include memory storing computer-executable instructions; and at least one processor configured to execute the computer-executable instructions such that the processor is configured to receive an instruction to provide the service from the service application, generate a plurality of sub-instructions by specifying the received instruction, and transmit each sub-instruction from among the plurality of sub-instructions to the robot, and wherein each sub-instruction, from among the plurality of sub-instructions, is an instruction for controlling the robot.

According to some example embodiments, a service application including a service logic related to a service provided from a robot may be separated from a robot. The service application may be implemented on a server or a client that is separated from the robot through a network.

According to some example embodiments, a cloud server may generate specified sub-instructions corresponding to a unit instruction to directly control a robot based on an abstracted instruction (incapable of directly controlling the robot) that is received from a service application, and to control the robot to provide a service according to the generated sub-instruction.

According to some example embodiments, a robot side may have no need to verify context information about a service provided from a robot and a service application side may have no need to verify a method of controlling a detailed function of the robot, thereby reducing complexity of development of the service application and facilitating scalability.

According to some example embodiments, it is possible to facilitate switching between robots providing different services by plugging various applications into a corresponding robot.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
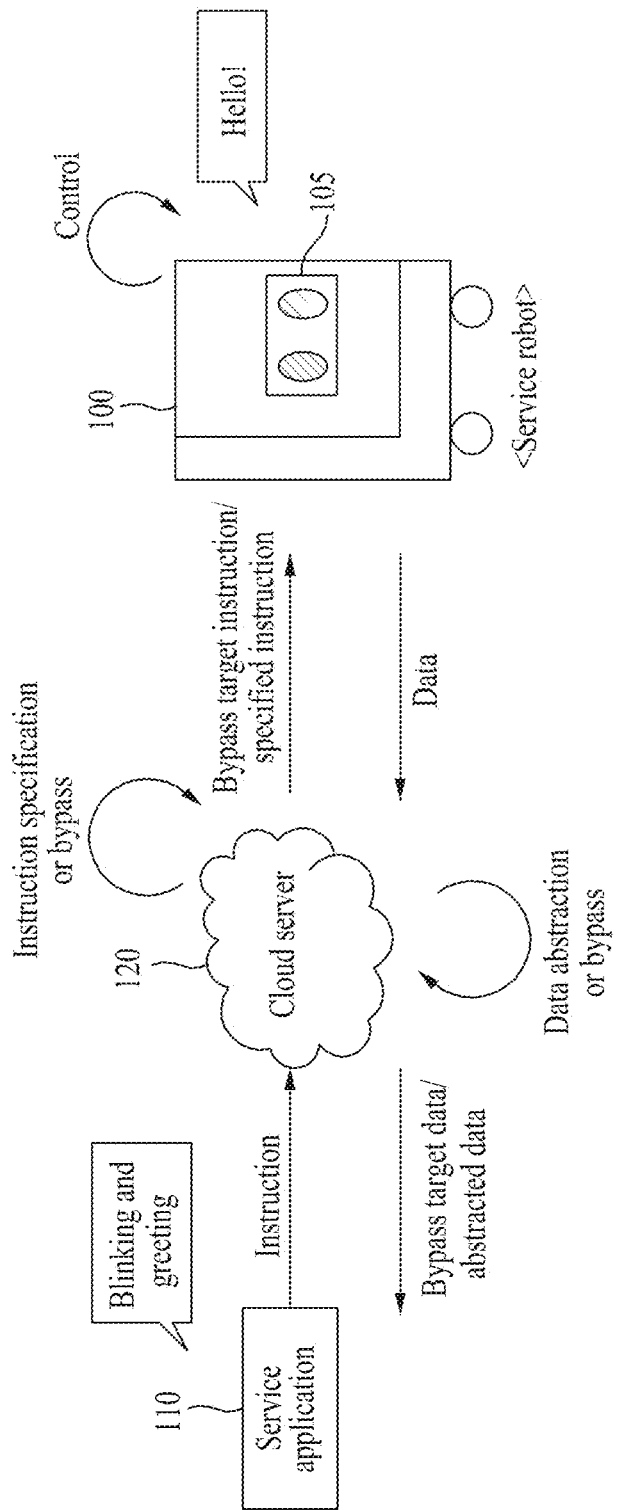
FIG. 1 is a diagram illustrating an example of a method of controlling a robot providing a service in connection with a service application, performed by a cloud server according to at least one example embodiment.

One or more example embodiments will be described in detail with reference to the accompanying drawings. Example embodiments, however, may be specified in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as being embodied by one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a method of controlling a robot providing a service in connection with a service application, performed by a cloud server according to at least one example embodiment.

A method in which, in providing a service through a robot 100 (or controlling the robot 100), a cloud server 120 receives an instruction (an abstracted instruction) from a service application 110, specifies the received instruction, and controls the robot 100 through the specified instruction is described with reference to FIG. 1.

Also, a method in which, as the robot 100 is controlled, the cloud server 120 receives, from the robot 100, data collected by the robot 100 (e.g., data associated with control of the robot 100), abstracts the data, and transmits the abstracted data to the service application 110 is described with reference to FIG. 1.

The cloud server 120 may determine whether an instruction from the service application 110 corresponds to a bypass target instruction that does not require specification, and, when the instruction corresponds to the bypass target instruction, may immediately transfer (route or forward) the corresponding instruction to the robot 100.

Also, the cloud server 120 may determine whether data from the robot 100 includes bypass target data that does not require abstraction and, when the data corresponds to the bypass target data, may immediately transfer (route or forward) the corresponding data to the service application 110.

For example, referring to FIG. 1, if an instruction from the service application 110 is to control a user experience (UX)-related component (or device) 105 of the robot 100 (e.g., a light emitting diode (LED) or other sound output devices corresponding to an eye of the robot 100), such as "blinking and greeting," the cloud server 120 may determine that the instruction corresponds to a bypass target instruction. Here, the instruction may be transferred to the robot 100 and the robot 100 may output an expression and sound "hello!" corresponding to greeting through the UX-related component 105.

In an example embodiment, a part of a service application including a service logic related to a service provided from the robot 100 may be implemented separate from the robot 100. That is, compared to the existing technology that needs to install an application including a service or functions associated with the corresponding service in the robot 100 to implement the robot 100 for providing a specific service, an example embodiment may reduce complexity of the service application 110 (of a side that operates and/or requests the service) and may improve scalability of the robot 100.

In the existing technology, a service logic related to the service provided from the robot 100 is mounted to the robot 100 as the service application 110 and the service application mounted to the robot 100 provides the service through interaction with the service application 110 (of the side that operates and/or requests the service).

In an example embodiment, since a service application including a service logic is not mounted to the robot 100, context information related to the service may not be verified on the side of the robot 100 and the robot 100 may operate by receiving an instruction to control a movement of the robot 100 and a function provided from the robot 100 (i.e., a unit instruction that may be executed by the robot 100) through the cloud server 120.

The service application 110 that issues the instruction may transmit (not a specified instruction to directly control the robot 100) but an abstracted instruction to the cloud server 120, and the cloud server 120 may generate the specified instruction to directly control the robot 100 based on the abstracted instruction. Therefore, a developer of the service application 110 may develop an application for providing the service through the robot 100 (i.e., capable of controlling the robot 100 only with the abstracted instruction), without a need to verify a method of controlling a detailed function of the robot 100.

The service application 110 may be implemented on a server or a client that is separated from the robot 100 through the network. Also, depending on example embodiments, the service application 110 may be implemented in an apparatus that combines with the robot 100 or that is included in the robot 100. Even in this example embodiment, the service application 110 and the robot 100 may be separated through the network.

Operations of the robot 100, the service application 110, and the cloud server 120 and a method of controlling the robot 100 are described in more detail with reference to FIGS. 2 to 15.

Figure 2:
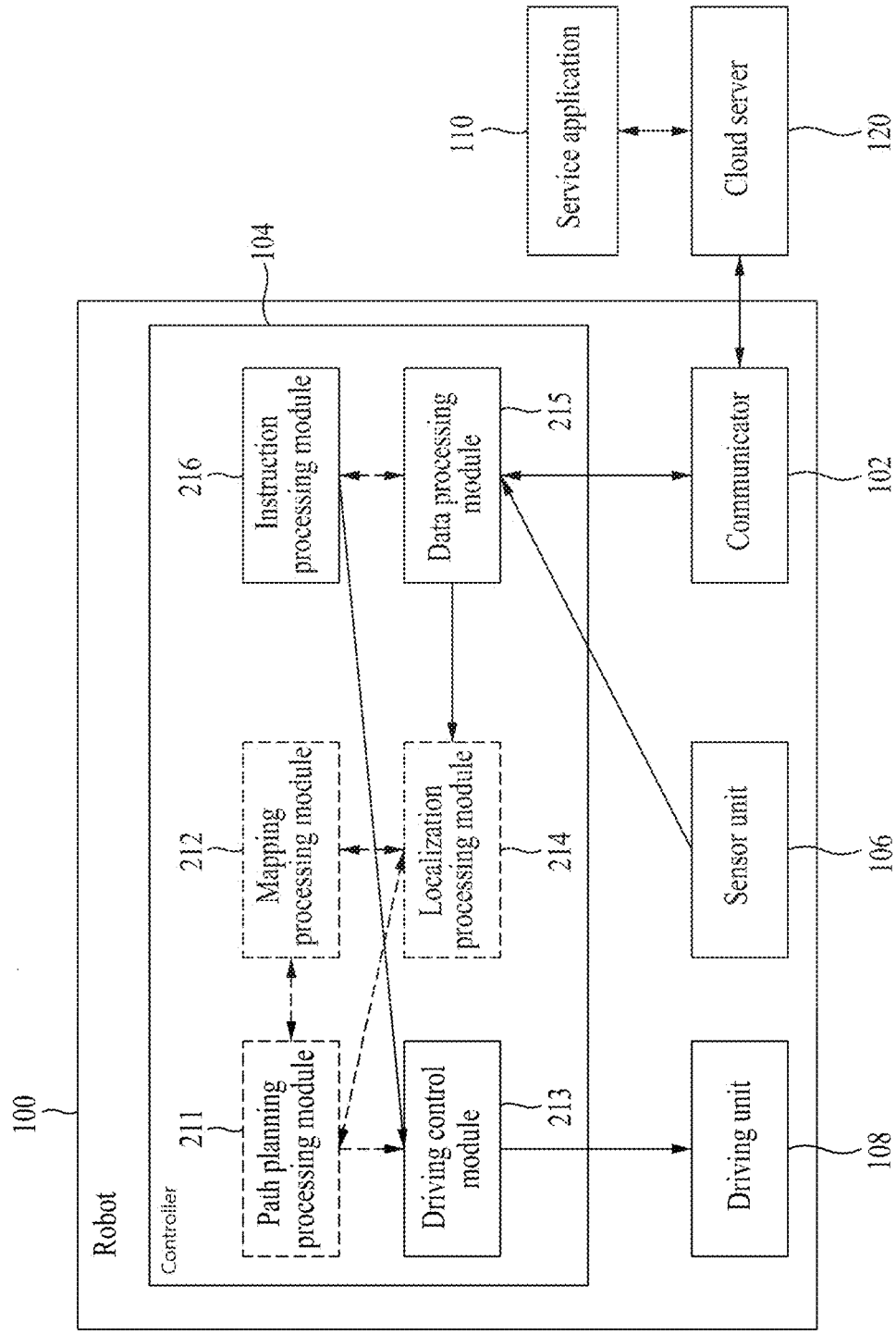
FIG. 2 is a diagram illustrating an example of a robot providing a service according to at least one example embodiment.

FIG. 2 is a diagram illustrating an example of a robot providing a service according to at least one example embodiment.

FIG. 2 illustrates the robot 100 providing a service in connection with the service application 110 by way of the cloud server 120. The robot 100 may be a service robot that provides a service under control of the cloud server 120 in a space such as an inside of a building. The space may also indicate an outdoor space without being limited to an indoor space. That is, the space may be an indoor space or an outdoor space in which a range is specified or may be a space that includes both the indoor space and the outdoor space.

The space may be, for example, a building (e.g., a company) in which delivery of goods is performed, a café in which delivery of food is performed, and an indoor/outdoor space in which a guide service is provided.

The robot 100 may provide a service to a user in the space by navigating through the space. The robot 100 may provide the service based on an instruction (an abstracted instruction) from the service application 110. The instruction from the service application 110 may be specified by the cloud server 120 and may be transferred to the robot 100. The robot 100) may be controlled based on the specified instruction.

The robot 100 may correspond to a brainless robot in terms of providing the cloud server 120 data related to control of the robot 100 (or data collected by the robot 100) as well as sensing data for performing a required detailed arithmetic operation, without performing the required detailed arithmetic operation in providing the service.

The service provided from the robot 100 may include a delivery service for delivering parcels or goods such as industrial products or food such as beverages in the space. That is, the robot 100 may be a delivery service robot or a serving service robot. Also, the service provided from the robot 100 may include a navigation service for guiding the user to a specific position in the space. Also, the service provided from the robot 100 may include a security service, an information providing service such as event/news, and a management service for plans present in the space.

The robot 100 may be a physical device and may include a controller 104, a driving unit 108, a sensor unit 106, and a communicator 102. Also, the robot 100 may further include a mounter configured to mount an object for service providing.

The controller 104 may be a physical processor built in the robot 100, and may include a path planning processing module 211, a mapping processing module 212, a driving control module 213, a localization processing module 214, a data processing module 215, and an instruction processing module 216. Here, depending on example embodiments, the path planning processing module 211, the mapping processing module 212, and the localization processing module 214 may be selectively included in the controller 104 to enable autonomous driving of the robot 100 although communication with the cloud server 120 fails. According to at least some example embodiments, the controller 104 may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the controller 104 may be configured, via hardware and/or software (e.g., firmware), to perform and/or control any operation described in the specification as being performed by a controller, a robot, or an element of any of the same.

The communicator 102 may be a component for communication between the robot 100 and another apparatus, such as another robot or the cloud server 120. That is, the communicator 102 may be a hardware module such as an antenna, a data bus, a network interface card, a network interface chip, and a networking interface port of the robot 100, or a software module such as a network device driver and a networking program, configured to transmit/receive data and/or information to/from the other apparatus.

The driving unit 108 may be a component configured to control and enable a movement of the robot 100, and may include equipment for performing the same. For example, the driving unit 108 may include a wheel. The driving unit 108 may control a movement and/or a function of the robot 100 in response to an instruction processed by the instruction processing module 216.

The sensor unit 106 may be a component configured to collect required data for autonomous driving and service providing of the robot 100. The sensor unit 106 may not include high-cost sensing equipment (scan equipment) and may include a sensor such as a low-cost ultrasound sensor and/or a low-cost camera. The sensor unit 106 may include a sensor configured to identify an obstacle/human present in a driving direction.

Although not illustrated, the sensor unit 106 may include a camera. The camera may be provided to recognize a user or an obstacle present around the robot 100. The camera may be an RGB camera or a monocular camera. Alternatively, the camera may include a depth camera.

As a processing example of the controller 104, the data processing module 215 of the controller 104 may transmit, to the cloud server 120, sensing data that includes a sensing value from the sensor unit 106 (e.g., an output value from sensors) through the communicator 102. The cloud server 120 may transmit, to the robot 100 path data generated using an indoor map in the space. The path data may be data that indicates a path through which the robot 100 provides the service. The path data may be transferred to the data processing module 215 through the communicator 102. The data processing module 215 may immediately transfer the path data to the driving control module 213 and the driving control module 213 may control autonomous driving of the robot 100 by controlling the driving unit 108 based on the path data.

When communication between the robot 100 and the cloud server 120 is unavailable, the data processing module 215 may transmit sensing data to the localization processing module 214 and may generate path data through the path planning processing module 211 and the mapping processing module 212 and directly process autonomous driving of the robot 100. For example, the controller 104 may identify a position at which the service is to be provided from a map using the path planning processing module 211 and the mapping processing module 212, may generate path data as data that indicates a path for providing the service at the identified position, and may control autonomous driving of the robot 100 such that the robot 100 may drive along a path according to the path data.

The robot 100 may move to a position for providing a service through autonomous driving using a map stored on a cloud, and may be controlled to avoid obstacles, cross a threshold, board or alight from an elevator, and perform an emergency stop while driving.

Meanwhile, the robot 100 may be distinct from a mapping robot used to generate a map inside the space. Here, since the robot 100 does not include high-cost sensing equipment (scan equipment), autonomous processing may be processed using an output value of a sensor, such as a low-cost ultrasound sensor and/or a low-cost camera. If the robot 100 has previously processed autonomous driving through communication with the cloud server 120, the robot 100 may perform further accurate autonomous driving by further using mapping data included in the existing path data received from the cloud server 120 and also using low-cost sensors. Depending on example embodiments, the robot 100 may also serve as the mapping robot.

Depending on example embodiments, the robot 100 may not include a service application including a service logic related to a service provided from the robot 100. Therefore, the robot 100 may not be directly controlled by an abstracted instruction for service providing from the service application 110 and may be controlled only by a unit instruction (e.g., a sub-instruction) that is generated in such a manner that the corresponding abstracted instruction is specified by the cloud server 120. The sub-instruction transmitted from the cloud server 120 to the robot 100 may not include context information related to the service. For example, the sub-instruction may not include information that indicates a type of the service or information related to the service such as an identifier of the service. Therefore, control of the robot 100 may not depend on a context of the service.

The instruction processing module 216 may receive the instruction (i.e., the specified instruction) received from the cloud server 120, through the communicator 102 or through the communicator 102 and the data processing module 215. The controller 104 may control the robot 100 based on the received instruction. The robot 100 may be controlled according to the specified instruction received from the cloud server 120 to provide the service to the user.

Meanwhile, the driving unit 108 may further include equipment related to the service provided from the robot 100 as well as equipment for movement of the robot 100. For example, the driving unit 108 may include the aforementioned mounting unit and a component (e.g., a robot arm) configured to grip or move an object related to the service. According to the specified instruction received from the cloud server 120, the driving unit 108 may be controlled to provide the service.

Also, the robot 100 may further include a speaker and/or a display or an LED to provide information/content. The devices may constitute the UX-related component 105 of FIG. 1. The instruction processing module 216 may control the robot 100 such that the UX-related component 105 may be controlled according to the instruction received from the cloud server 120.

Depending on example embodiments, the service application 110 may include a logic for controlling a service scenario and a UI of the robot 100. The robot 100 may include a logic (e.g., a logic circuit such as, for example, a safety related logic circuit) required for an operation of the robot 100. According to the abstracted instruction (e.g., a move instruction) from the service application 110, the cloud server 120 may determine a detailed movement plan corresponding to the instruction and may control the robot 100. The robot 100 may drive along the determined movement plan.

A method of receiving an instruction from the cloud server 120 and controlling the robot 100 according to the received instruction is further described with reference to FIGS. 3 to 15.

Description related to technical features made above with reference to FIG. 1 may apply to FIG. 2 as is and thus, further description related thereto is omitted.

Figure 3:
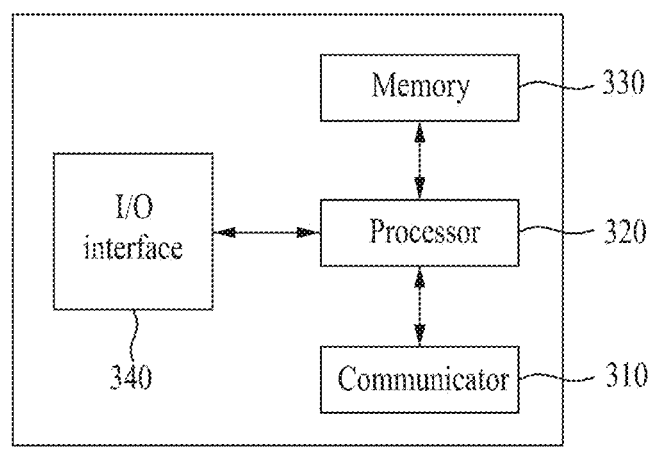
FIGS. 3 and 4 are diagrams illustrating examples of a cloud server controlling a robot according to at least one example embodiment.
Figure 4:
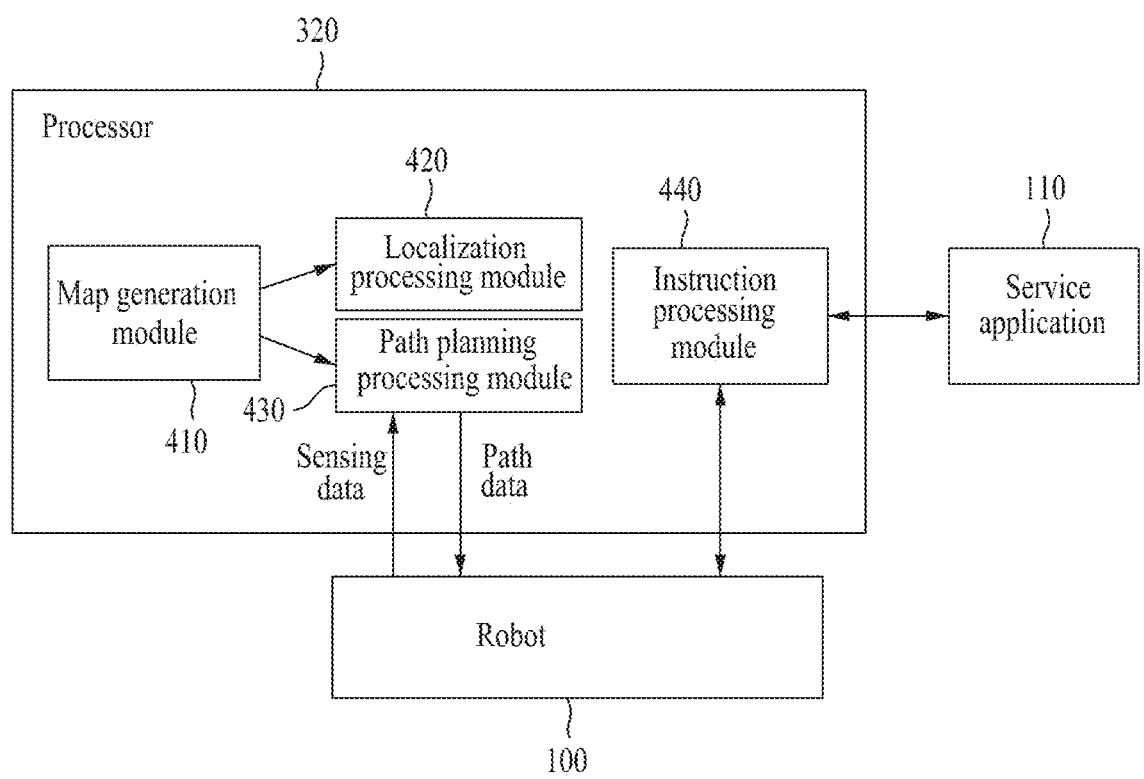

FIGS. 3 and 4 are diagrams illustrating examples of a cloud server controlling a robot according to at least one example embodiment.

The cloud server 120 may be a device configured to control a movement (i.e., driving) of the robot 100 in a space and a function provided from the robot 100. When a plurality of robots 100 is present, the cloud server 120 may control a movement of each of the plurality of robots 100 and a function thereof. Through communication with the robot 100, the cloud server 120 may set a path through which the corresponding robot 100 is to move to provide a service and may transfer information about the path to the robot 100. The robot 100 may drive according to information about the received path and may provide the service to a user. That is, the cloud server 120 may control the movement of the robot 100 to move (drive) along the set path.

The cloud server 120 may be a robot control system or may constitute a portion thereof.

The cloud server 120 may include at least one computing device and may be configured as a server present in or outside the space.

Referring to FIG. 3, the cloud server 120 may include a memory 330, a processor 320, a communicator 310, and an I/O interface 340.

The memory 330 may include, as a non-transitory computer-readable record medium, a permanent mass storage device such as a random access memory (RAM), a read only memory (ROM), and a disk drive. Here, the ROM and the permanent mass storage device may be included as a separate permanent storage device separate from the memory 330. Also, an operating system (OS) and at least one program code may be stored in the memory 330. Such software components may be loaded from another non-transitory computer-readable record medium separate from the memory 330. The other non-transitory computer-readable record medium may include a non-transitory computer-readable record medium, for example, a floppy drive, a disk, a tape, a DVD/CD-ROM drive, and a memory card. According to other example embodiments, the software components may be loaded to the memory 330 through the communicator 310, instead of the non-transitory computer-readable record medium.

The processor 320 may be configured to process instructions of a computer program by performing basic arithmetic operations, logic operations, and I/O operations. The instructions may be provided from the memory 330 or the communicator 310 to the processor 320. For example, the processor 320 may be configured to execute an instruction received according to a program code loaded to the memory 330. The processor 320 may include components, for example, a map generation module 410, a localization processing module 420, a path planning processing module 430, and an instruction processing module 440 of FIG. 4.

Each of the components, for example, the map generation module 410, the localization processing module 420, the path planning processing module 430, and the instruction processing module 440, of the processor 320 may be a software module and/or a hardware module as a portion of the processor 320 and may represent a function (functional block) configured by the processor 320. The components, for example, the map generation module 410, the localization processing module 420, the path planning processing module 430, and the instruction processing module 440, of the processor 320 are described with reference to FIG. 4.

The communicator 310 may be a component for communication between the cloud server 120 and another apparatus, such as, for example, the robot 100 or an apparatus with the service application 110. That is, the communicator 310 may be a hardware module, such as an antenna, a data bus, a network interface card, a network interface chip, and a networking interface port of the cloud server 120, or a software module, such as a network device driver and a networking program, configured to transmit/receive data and/or information to/from the other apparatus.

The I/O interface 340 may be a device for an interface with an input device such as a keyboard or a mouse and an output device such as a display or a speaker.

Depending on example embodiments, the cloud server 120 may include a number of components greater than or less than a number of components shown in FIG. 3.

In an example embodiment, the cloud server 120 may receive an instruction (e.g., an abstracted instruction) for service providing by the robot 100 from the service application 110, may process (i.e., specify) the received instruction, and may generate sub-instructions (i.e., the specified instructions) to control the robot 100.

The components, for example, the map generation module 410, the localization processing module 420, the path planning processing module 430, and the instruction processing module 440, of the processor 320 are further described with reference to FIG. 4. Referring to FIG. 4, the processor 320 may include the map generation module 410, the localization processing module 420, the path planning processing module 430, and the instruction processing module 440. Components included in the processor 320 may be representations of different functions performed by at least one processor included in the processor 320 in response to a control instruction according to a code of at least one computer program or a code of an OS.

The map generation module 410 may be a component configured to generate an indoor map of target facility based on sensing data that is generated by a mapping robot (not shown) autonomously driving in a building for the target facility (e.g., inside of the building).

Here, the localization processing module 420 may determine a position of the robot 100 in the target facility (e.g., a building or a floor of the building) using sensing data received from the robot 100 through a network and the indoor map of the target facility generated through the map generation module 410.

The path planning processing module 430 may generate a control signal for controlling autonomous driving of the robot 100 base on the received sensing data and the generated indoor map. For example, the path planning processing module 430 may generate a path (i.e., path data) for driving of the robot 100. The generated path (i.e., path data) may be set for the robot 100 for driving of the robot 100 that follows the corresponding path. The cloud server 120 may transmit information about the generated path to the robot 100 through the network. For example, information about the path may include information about a current position of the robot 100, information for mapping the current position and the indoor map, and path planning information. The path planning processing module 430 may generate a path for the robot 100 and may set the path for the robot 100. The cloud server 120 may control a movement of the robot 100 such that the robot 100 may move along the set path (i.e., along the set path).

The generated path may be a path through which the robot 100 drives to provide a service in the space. The path planning processing module 430 may identify a position at which the robot 100 may provide the service in the space from the map and may generate a path for providing the service at the corresponding position.

The instruction processing module 440 may receive an instruction (i.e., an abstracted instruction) for service providing by the robot 100 from the service application 110, may process (i.e., specify) the received instruction, and may generate sub-instructions (i.e., specified instructions) for controlling the robot 100. Also, the instruction processing module 440 may transmit the generated sub-instructions to the robot 100 and may control the robot 100 based on the sub-instructions.

In an example embodiment, the robot 100 may not include a service application including a service logic related to the service provided from the robot 100. The robot 100 may not be directly controlled by an abstracted instruction for service providing from the service application 110.

A movement and a function of the robot 100 may be controlled only by a specified instruction provided from the cloud server 120. The instruction processing module 440 may specify the abstracted instruction received from the service application 110 into unit instructions executable by the robot 100 and may generate sub-instructions corresponding to the respective unit instructions. The instruction processing module 440 may transmit each of the sub-instructions to the robot 100 and may control the robot 100 accordingly.

Also, the instruction processing module 440 may immediately transfer the instruction to the robot 100 based on a type of the instruction received from the service application 110, may specify the corresponding instruction, and then transmit the specified sub-instructions to the robot 100.

In an example embodiment, since the robot 100 does not include a portion of a service logic corresponding to the service application 110, a developer of the service application 110 may develop an application for providing a service through the robot 100 without a need to verify a method of controlling a detailed function of the robot 100. Also, various service applications providing different services may be easily plugged into the robot 100.

Also, the instruction processing module 440 may receive, from the robot 100, data collected by the robot 100 (e.g., data related to control of the robot 100). The instruction processing module 440 may transfer the data to the service application 110 based on a type of the received data or may abstract the corresponding data and transmit the abstracted data to the service application 110.

Operations of the robot 100, the service application 110, and the cloud server 120 and a method of controlling the robot 100 are further described with reference to FIGS. 5 to 15.

Description related to technical features made above with reference to FIGS. 1 and 2 may apply to FIGS. 3 and 4 as is and thus, further description related thereto is omitted.

Figure 5:
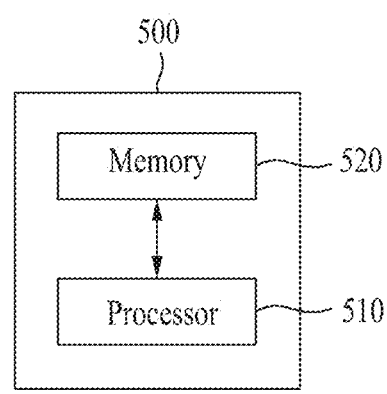
FIG. 5 is a diagram illustrating an example of an apparatus including a service application according to at least one example embodiment.

FIG. 5 is a diagram illustrating an example of an apparatus including a service application according to at least one example embodiment.

As described above, the service application 110 may be implemented on a server or a client that is separated from the robot 100 through a network. An apparatus 500 may correspond to the server or the client. Depending on example embodiments, the apparatus 500 may be implemented in an apparatus that combines with the robot 100 or that is included in the robot 100. Also, the apparatus 500 may be implemented in an apparatus that combines with the cloud server 120 or that is included in the cloud server 120. Even in such an example embodiment, the service application 110 and the robot 100 may be separated through the network.

The apparatus 500 may refer to any terminal device or electronic device that may include, for example, a personal computer (PC), a laptop computer, a smartphone, a tablet, a wearable computer, an Internet of Things (IoT) device, and the like. The apparatus 500 may be a terminal used by a user that operates and/or requests a service provided from the robot 100.

Through the service application 110 mounted to the apparatus 500, the user may instruct the robot 100 to provide a service. The instruction may be transferred to the robot 100 through the cloud server 120, or may be specified through processing by the cloud server 120 and then transmitted to the robot 100.

Also, through the service application 110 mounted to the apparatus 500, the apparatus 500 may receive data from the robot 100. The data may be transferred to the service application 110 through the cloud server 120, or may be abstracted through processing by the cloud server 120 and then transmitted to the service application 110.

Referring to FIG. 5, the apparatus 500 may include a communicator 510 and a processor 520. The communicator 510 may be a component for communication between the apparatus 500 and the cloud server 120 or the robot 100. That is, the communicator 510 may be a hardware module such as a network interface card, a network interface chip, and a network interface port or a software module such as a network device driver and a networking program, configured to transmit/receive data and/or information to the other apparatus.

The processor 520 may manage components of the apparatus 500 and may execute a program or an application used by the user terminal. For example, the processor 520 may install and execute the service application 110 for generating and transmitting an instruction for providing of the service by the robot 100 and may perform an arithmetic operation required for execution of the service application 110 and processing of data. The processor 520 may be at least one processor or at least one core in the processor.

Although not illustrated, the apparatus 500 may include a memory. The memory may include a permanent mass storage device such as a RAM, a ROM, and a disk drive as a non-transitory computer-readable record medium. Here, the ROM and the permanent mass storage device may be included as a separate permanent storage device separate from the memory. Also, an OS and at least one program code may be stored in the memory. Such software components may be loaded from another non-transitory computer-readable record medium separate from the memory. The other non-transitory computer-readable record medium may include a non-transitory computer-readable record medium, for example, a floppy drive, a disk, a tape, a DVD/CD-ROM drive, a memory card, etc. According to other example embodiments, the software components may be loaded to the memory through the communicator 510, instead of the non-transitory computer-readable record medium.

The processor 520 may be configured to process instructions of a computer program by performing basic arithmetic operations, logic operations, and I/O operations. The instructions may be provided from the memory or the communicator 510 to the processor 520. For example, the processor 520 may be configured to execute an instruction received according to a program code loaded to the memory.

When the apparatus 500 is a terminal of a user that operates and/or request the service, the apparatus 500 may include a display. The display may display a control state of the robot 100, information for management of the robot 100, and monitoring information about the robot 100 that may include a service providing state of the robot 100. The display may include a touchscreen.

In an example embodiment, the service application 110 that is an entity generating an abstracted instruction to provide a service and the cloud server 120 that is an entity specifying the abstracted instruction and transmitting the same to the robot 100.

Therefore, a layer corresponding to the service application 110, a layer corresponding to the cloud server 120, and a layer corresponding to the robot 100 may be separated from each other. Therefore, different security policies (or at least two security policies) may be set for the service application 110, the cloud server 120, and the robot 100, and only a layer that relatively frequently requires update may be separately managed.

Also, in an example embodiment, the robot 100 may be configured to provide an updated service by updating only the layer corresponding to the service application 110.

Also, since different service applications may be easily plugged into the robot 100, it is possible to implement the robot 100 that provides various services without departing from the scope of functions provided from the robot 100.

The developer of the service application 110 may implement the service provided from the robot 100 in the service application 110 without detailed domain knowledge about the robot 100 (i.e., without a need to cope with an unnecessary trouble shooting or an issue about a driving/operation of the robot 100).

Therefore, the scalability of the robot 100 and the service application 110 may be improved.

Description related to technical features made above with reference to FIGS. 1 to 4 may apply to FIG. 5 as is and thus, further description related thereto is omitted.

In the following detailed description, for clarity of description, an operation performed by the robot 100, the cloud server 120, or the service application 110, for example, processors of the robot 100, the cloud server 120, or the apparatus 500, is described as an operation performed by the robot 100, the cloud server 120, or the service application 110.

Figure 6:
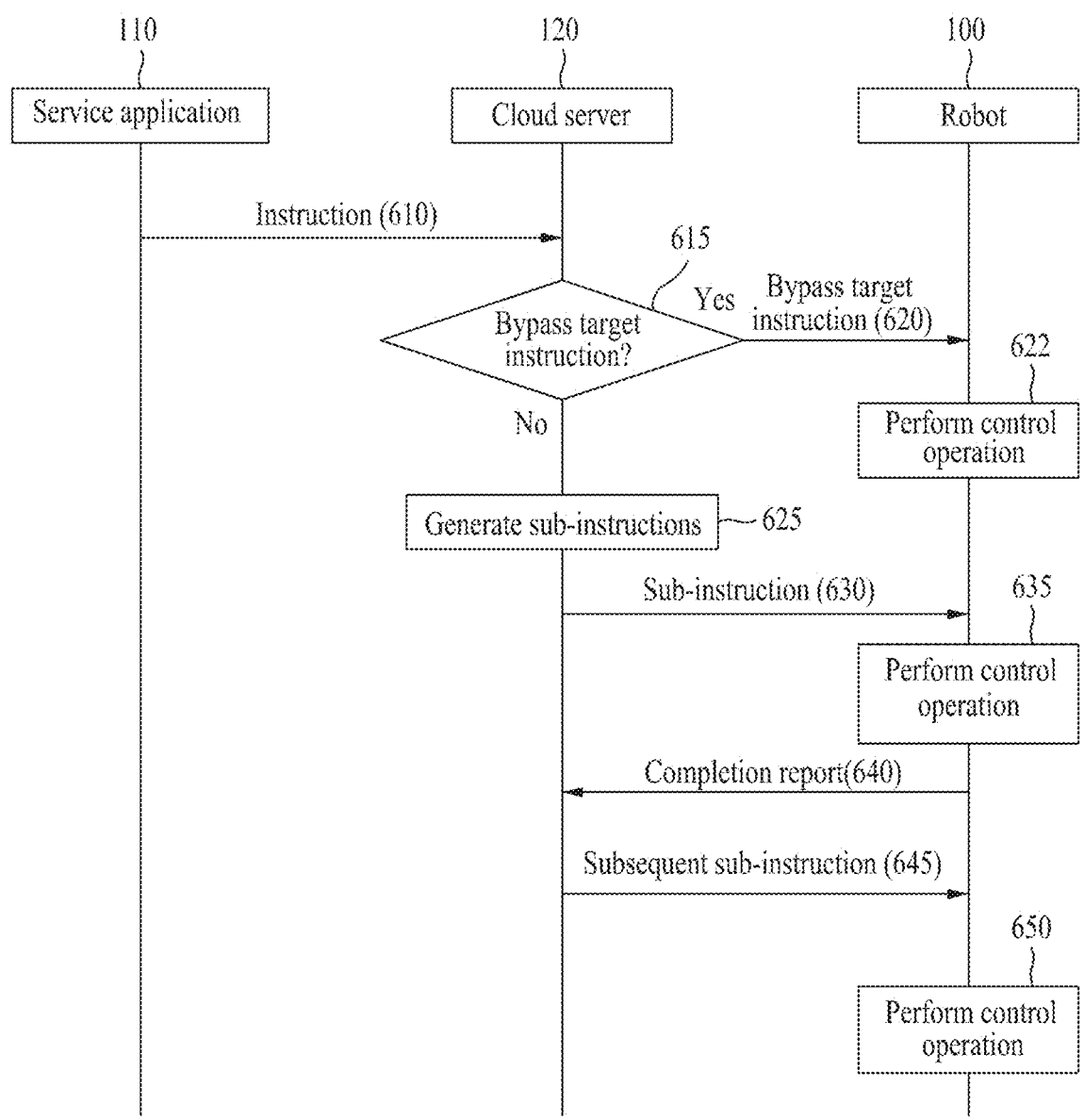
FIG. 6 is a flowchart illustrating an example of a method of controlling a robot providing a service in connection with a service application, performed by a cloud server according to at least one example embodiment.

FIG. 6 is a flowchart illustrating an example of a method of controlling a robot providing a service in connection with a service application, performed by a cloud server according to at least one example embodiment.

Referring to FIG. 6, in operation 610, the cloud server 120 may receive an instruction to provide a service from the service application 110. The instruction received from the service application 110 may relate to requesting the robot 100 to perform a specific operation and/or function and may be an abstracted instruction. The abstracted instruction may be an instruction incapable of directly controlling the robot 100 to provide the service (without being specified). The abstracted instruction may include, for example, an instruction to move the robot 100 to a delivery position or a pick-up position in a delivery service, an instruction to guide a user to a specific position in a navigation service, and an instruction to request the robot 100 to perform a specific function.

In operation 615, the cloud server 120 may determine whether the instruction from the service application 110 is a bypass target instruction.

In operation 620, the cloud server 120 may immediately transfer the instruction from the service application 110 to the robot 100, when the instruction from the service application 110 is the bypass target instruction (i.e., when the result of operation 615 is YES (e.g., "Y")). In operation 622, the robot 100 may be controlled based on the bypass target instruction. According to at least some example embodiments, an instruction that is determined by be a bypass target instruction is an instruction that is capable of directly controlling the robot 100 (e.g., without performing instruction specification, an example of which is discussed in greater detail below with reference to operation 625 of FIG. 6).

The bypass target instruction may be a simple instruction that does not need to be specified by the cloud server 120 and may be an instruction that is directly transferred (routed) from the service application 110 to the robot 100 through the cloud server 120. The bypass target instruction may be, for example, an instruction to control the UX-related component 105 of the robot 100. For example, the bypass target instruction may be an instruction to control ON/OFF of an LED or an indicator included in the robot 100 (e.g., an LED or other visual indicators corresponding to a gaze of the robot 100) or an instruction to output specific sound from a speaker included in the robot 100. Also, an instruction to manually control a movement of the robot 100 may be the bypass target instruction.

The cloud server 120 may analyze a type of the instruction from the service application 110 and may determine whether the corresponding instruction is the bypass target instruction. For example, the cloud server 120 may determine whether the instruction is the bypass target instruction by analyzing a protocol of the instruction from the service application 110. That is, the cloud server 120 may determine whether to bypass the instruction to the robot 100 by interpreting the protocol of the received instruction.

In operation 625, the cloud server 120 may generate a plurality of sub-instructions by specifying (e.g., parsing, translating, interpreting, etc.) the instruction received from the service application 110. Operation 625 of generating the sub-instructions may be performed when the instruction from the service application 110 is not the bypass target instruction (i.e., when the result of operation 615 is NO (e.g., "N")). "Specification of an instruction" may indicate, for example, dividing, parsing, and/or translating the abstracted instruction from the service application 110 into instructions to directly control the robot 100. That is, each sub-instruction generated in operation 625 may be generated by specifying the abstracted instruction from the service application 110 to directly control the robot 100. Thus, according to at least some example embodiments, each sub-instruction generated by specifying an abstracted instruction is an instruction that is capable of directly controlling the robot 100.

In operation 630, the cloud server 120 may transmit each sub-instruction of the generated sub-instructions to the robot 100. In operation 635, the robot 100 may be controlled based on the received each sub-instruction. The robot 100 may complete an operation requested by the instruction from the service application 110 by completing the control according to the sub-instructions.

Each sub-instruction may constitute a unit instruction executable by the robot 100. That is, in operation 625, the cloud server 120 may generate the sub-instructions by dividing the instruction received from the service application 110 into a plurality of unit instructions. For example, the cloud server 120 may generate the sub-instructions by dividing the instruction received from the service application 110 based on a predetermined (or, alternatively, desired) time unit or size unit. If an operation indicated by the instruction received from the service application 110 is dividable into a plurality of operations based on a time, an instruction received from the service application 110 corresponding to each of the operations may be classified into a sub-instruction.

A method of generating sub-instructions in which an abstracted instruction is specified based on the abstracted instruction is further described with reference to FIGS. 7 and 8.

The cloud server 120 may sequentially transmit each of the generated sub-instructions to the robot 100. Each sub-instruction may be transferred from the cloud server 120 to the robot 100 at an opportune time according to an operation of the robot 100.

For example, in operation 630, the cloud server 120 may transmit a first sub-instruction among the sub-instructions to the robot 100. The first sub-instruction may indicate a first operation to be performed first by the robot 100 to complete an operation of the robot 100 indicated by the instruction received from the service application 110. In operation 635, the robot 100 may perform the first operation according to the first sub-instruction and may transmit, to the cloud server 120, a completion report (or a signal indicating completion) indicating that performing the first operation is completed. In operation 640, the cloud server 120 may receive the completion report. In operation 645, in response to the received completion report, the cloud server 120 may transmit a second sub-instruction successive to the first sub-instruction among the sub-instructions to the robot 100. Here, the second sub-instruction may indicate a subsequent operation of the first operation to complete the operation of the robot 100 indicated by the instruction received from the service application 110. In operation 650, the robot 100 may perform the second operation according to the second sub-instruction. Likewise, the robot 100 may transmit, to the cloud server 120, a completion report indicating that performing the second operation is completed and may receive a corresponding subsequent sub-instruction from the cloud server 120.

As described above, the cloud server 120 may sequentially transmit each of the generated sub-instructions to the robot 100 and may transfer the instruction to the robot 100 at an opportune time by transmitting a subsequent sub-instruction to the robot 100 as an operation indicated by one sub-instruction is performed by the robot 100. Therefore, a malfunction of the robot 100 may be prevented. That is, the cloud server 120 may specify the instruction received from the service application 110 by dividing the instruction into a plurality of missions, and, in response to one mission being completed according to a sub-instruction transmitted to the robot 100, may transmit a sub-instruction corresponding to a subsequent mission to the robot 100.

Also, dissimilarly, after performing an operation according to a sub-instruction, the robot 100 may not transmit a separate report to the cloud server 120. Here, the cloud server 120 may monitor the robot 100, for example, in real time, and, when the robot 100 is determined to have performed an operation according to a sub-instruction, may transmit a subsequent sub-instruction to the robot 100.

Alternatively, the cloud server 120 may sequentially transmit each of the sub-instructions to the robot 100 at a predetermined (or, alternatively, desired) time interval.

As described above, in an example embodiment, the cloud server 120 may analyze the instruction from the service application 110 and may bypass the corresponding instruction to the robot 100 based on a type of the instruction or may generate sub-instructions by specifying the instruction and transmit the generated sub-instructions to the robot 100, thereby appropriately controlling the robot 100.

Although not illustrated, the robot 100 may determine whether the received sub-instruction is a bypassed instruction from the service application 110. Here, the robot 100 may determine whether the received instruction (i.e., sub-instruction) is bypassed from the service application 110 by analyzing a protocol of the received instruction (i.e., sub-instruction). When the received instruction (i.e., sub-instruction) corresponds to the bypassed instruction, the robot 100 may perform an operation corresponding to the corresponding bypassed instruction. When the received sub-instruction does not correspond to the bypassed instruction (i.e., corresponds to the specified instruction), the robot 100 may perform an operation corresponding to the specified instruction.

Description related to technical features made above with reference to FIGS. 1 to 5 may apply to FIG. 6 as is and thus, further description related thereto is omitted.

Figure 7:
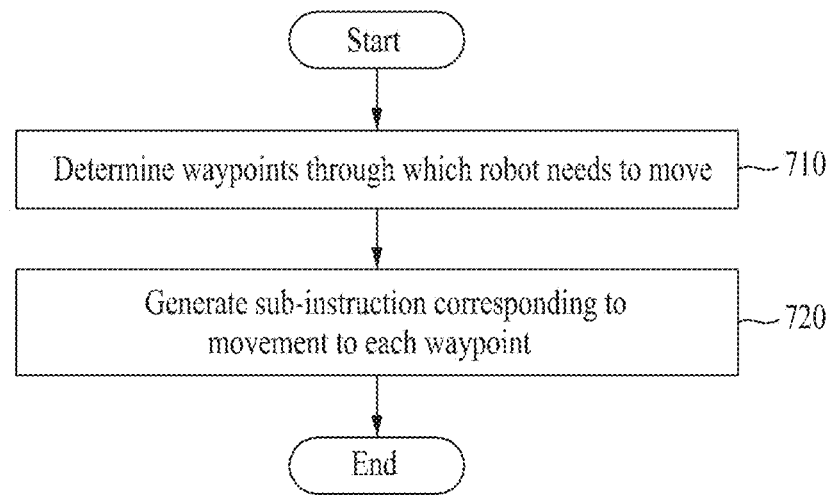
FIGS. 7 and 8 are flowcharts illustrating examples of a method of generating a sub-instruction in which an abstracted instruction is specified based on the abstracted instruction according to at least one example embodiment.
Figure 8:
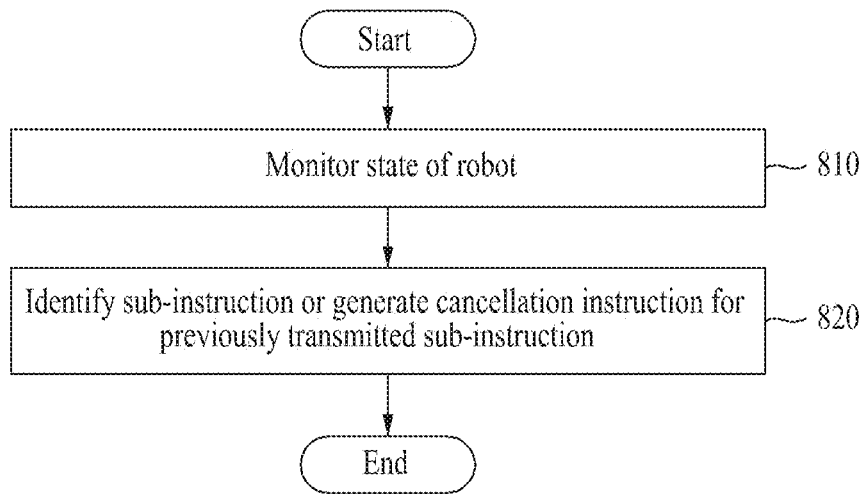

FIGS. 7 and 8 are flowcharts illustrating examples of a method of generating a sub-instruction in which an abstracted instruction is specified based on the abstracted instruction according to at least one example embodiment.

A method of generating, by the cloud server 120, sub-instructions by dividing an instruction received from the service application 110 into a plurality of unit instructions in operation 625 of FIG. 6 is further described. The cloud server 120 may generate the sub-instructions by dividing the instruction received from the service application 110 based on a predetermined (or, alternatively, desired) time unit or size unit.

For example, a case in which the instruction from the service application 110 refers to an instruction to move the robot 100 to a destination is described with reference to FIG. 7. The destination may be a destination used for the robot 100 to deliver goods or a destination for the robot 100 to guide a user.

Referring to FIG. 7, in operation 710, the cloud server 120 may determine a plurality of waypoints through which the robot 100 needs to move from a current position of the robot 100 to the destination.

In operation 720, the cloud server 120 may generate an instruction to move the robot 100 to each waypoint of the waypoints as each corresponding sub-instruction and may transmit the generated each sub-instruction to the robot 100.

For example, the cloud server 120 may determine the respective coordinates (arrangement of coordinates) of the plurality of waypoints through which the robot 100 needs to move from a current position of the robot 100 to the destination and may transmit, to the robot 100, an instruction indicating a movement to each coordinate as each sub-instruction.

Each of the waypoints may be, for example, a position in the space and may be a position in front of an elevator (i.e., in front of a door) when the robot 100 needs to move between floors to move to the destination. Also, a waypoint may be a position in front of a door in the space, a position corresponding to a corner in the space, and a position corresponding to an edge or a vertex in the corner. The waypoint may or may not include the destination.

As described above, when a movement of the robot 100 to one waypoint is completed, the cloud server 120 may receive a completion report from the robot 100 and, in response thereto, the cloud server 120 may transmit a sub-instruction instructing the robot 100 to move to a subsequent waypoint.

The robot 100 may move to the destination by being controlled according to sub-instructions corresponding to the movement to the respective waypoints.

As described above, the instruction received from the service application 110 may be specified into the movement to the plurality of waypoints, which may lead to generating the specified sub-instructions.

Hereinafter, a method of monitoring, by the cloud server 120, a state of the robot 100 and transmitting a suitable sub-instruction to the robot 100 is described with reference to FIG. 8.

Referring to FIG. 8, in operation 810, the cloud server 120 may monitor the state of the robot 100. The state of the robot 100 may be monitored in real time or almost in real time.

In operation 820, the cloud server 120 may identify a suitable sub-instruction or may generate a cancellation instruction for a previously transmitted sub-instruction based on the monitored state of the robot 100. The cloud server 120 may transmit the identified sub-instruction or the cancellation instruction to the robot 100.

The cloud server 120 may determine a sub-instruction required for the robot 100 to provide a service among sub-instructions that are generated by specifying the instruction received from the service application 110 based on the monitored state of the robot 100 and may transmit the determined sub-instruction to the robot 100. For example, when the movement of the robot 100 to one waypoint is confirmed, the cloud server 120 may identify a sub-instruction indicating a movement to a subsequent waypoint from among sub-instructions and may transmit the identified sub-instruction to the robot 100.

Also, the cloud server 120 may transmit, to the robot 100, the cancellation instruction to cancel the previously transmitted sub-instruction based on the monitored state of the robot 100. For example, when the robot 100 is unable to perform an operation according to the previously transmitted sub-instruction (since the robot 100 is stuck at a specific position, malfunctions, or becomes inoperable), the cloud server 120 may transmit, to the robot 100, the cancellation instruction to cancel the previously transmitted sub-instruction. Depending on cases, the cloud server 120 may transmit the sub-instruction to another robot and may control the other robot to perform the unperformed operation. Alternatively, the cloud server 120 may transmit, to the robot 100, a delay instruction to delay the operation according to the previously transmitted sub-instruction (i.e., to perform the corresponding operation later).

As described above, the cloud server 120 may monitor the state of the robot 100 and may transmit the sub-instruction to the robot 100 at an opportune time or may transmit an instruction to cancel/delay the previously transmitted instruction.

Figure 12:
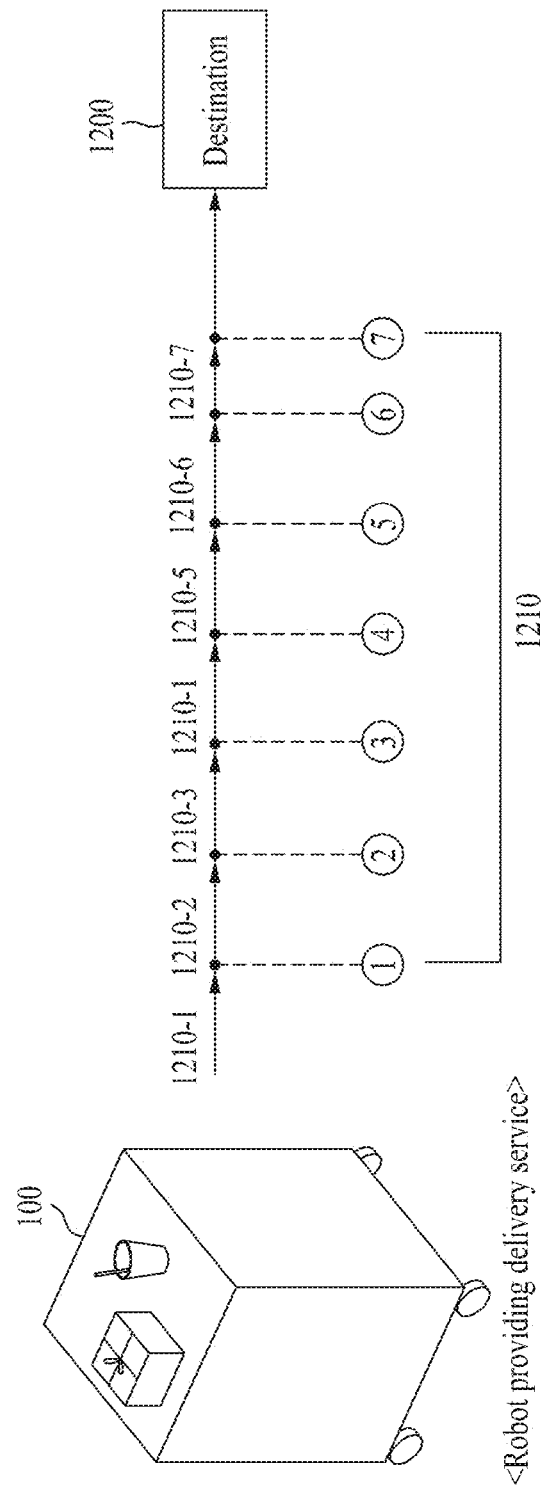
FIGS. 12 and 13 illustrate examples of a method of generating specified sub-instructions based on an abstracted instruction from a service application and controlling a robot according to at least one example embodiment.
Figure 13:
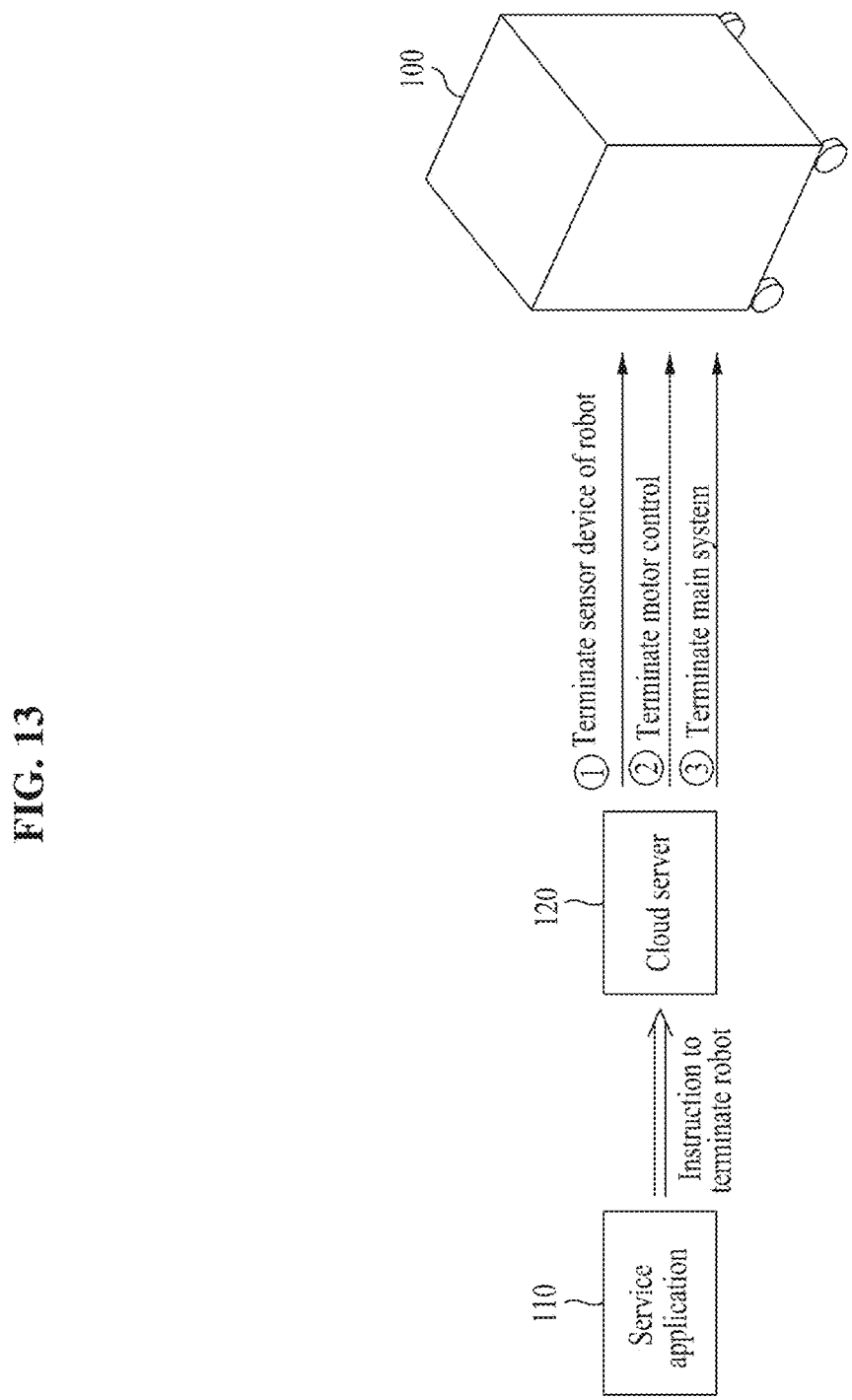

In this regard, FIGS. 12 and 13 illustrate examples of generating specified sub-instructions based on an abstracted instruction from a service application and controlling a robot according to at least one example embodiment.

Referring to FIG. 12, it is assumed that the robot 100 is a robot providing a delivery service and an instruction to move to a destination 1200 is received at the cloud server 120 from the service application 110.

The cloud server 120 may establish a path plan for a movement of the robot 100 to the destination 1200 based on the instruction from the service application 110. The cloud server 120 may determine a plurality of waypoints 1210 ① to ⑦ to be included in the path for the movement of the robot 100 to the destination 1200 and may generate sub-instructions 1210-1 to 1210-7 indicating a movement to the waypoints 1210 ① to ⑦.

The cloud server 120 may sequentially transmit the respective sub-instructions 1210-1 to 1210-7 to the robot 100, and may control the robot 100 to reach the destination 1200 through the waypoints 1210 ① to ⑦. Each of the waypoints 1210 ① to ⑦ may indicate a coordinate value of a corresponding position.

When the path from a current position of the robot 100 to the destination 1200 includes a movement of the robot 100 between floors, at least one of the waypoints 1210 ① to ⑦ may indicate a position corresponding to an elevator that the robot 100 is to board or alight from (i.e., a position corresponding to a front of a door of an elevator at which the robot 100 is to board and/or alight from). Therefore, the robot 100 may move to the destination 1200 including the movement between the floors.

As described above, when the robot 100 is instructed to move to the destination 1200, the robot 100 may be controlled by receiving sub-instructions (indicating waypoints) from the cloud server 1200. That is, the robot 100 may operate by receiving a unit instruction corresponding to an instruction of a unit executable at once. The unit instruction may indicate an arrangement of coordinates processable by the robot 100, which differs from the abstracted instruction.

Referring to FIG. 13, it is assumed that an instruction to terminate the robot 100 is received at the cloud server 120 from the service application 110.

The cloud server 120 may generate three sub-instructions to ① terminate a sensor device of the robot 100, ② terminate a motor control of the robot 100, and ③ terminate a main system of the robot 100, based on an abstracted instruction to terminate the robot 100. The cloud server 120 may sequentially transmit the sub-instructions of ① to ③ to the robot 100. For example, the cloud server 120 may transmit ② to the robot 100 when the sensor device of the robot 100 is terminated according to ① and may transmit ③ to the robot 100 when the motor control of the robot 100 is terminated according to ②. In this manner, the robot 100 may be terminated.

The aforementioned cloud server 120 may refer to a server configured to control a single function of the robot 100. For example, the cloud server 120 may be a server for controlling a movement of the robot 100 as described above with reference to FIG. 12, or may be a server for controlling a termination (or start) of the robot 100, as described above with reference to FIG. 13. Alternatively, the cloud server 120 may be configured to control each of a plurality of functions of the robot 100.

Description related to technical features made above with reference to FIGS. 1 to 6 may apply to FIGS. 7, 8, 12, and 13 as is and thus, further description related thereto is omitted.

Figure 9:
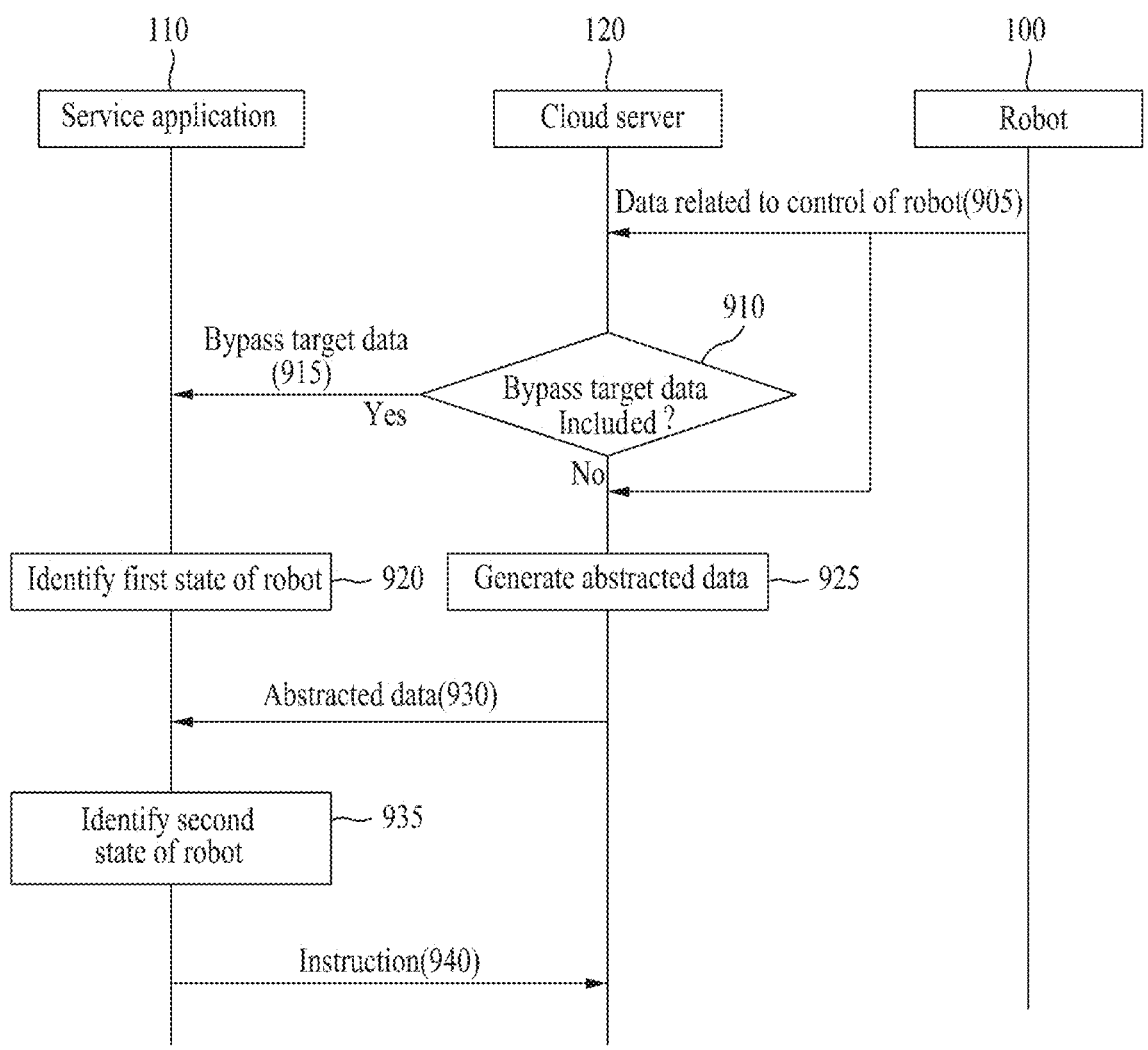
FIGS. 9 and 10 are flowcharts illustrating examples of a method of processing data from a robot and generating and processing abstracted data based on corresponding data according to at least one example embodiment.
Figure 10:
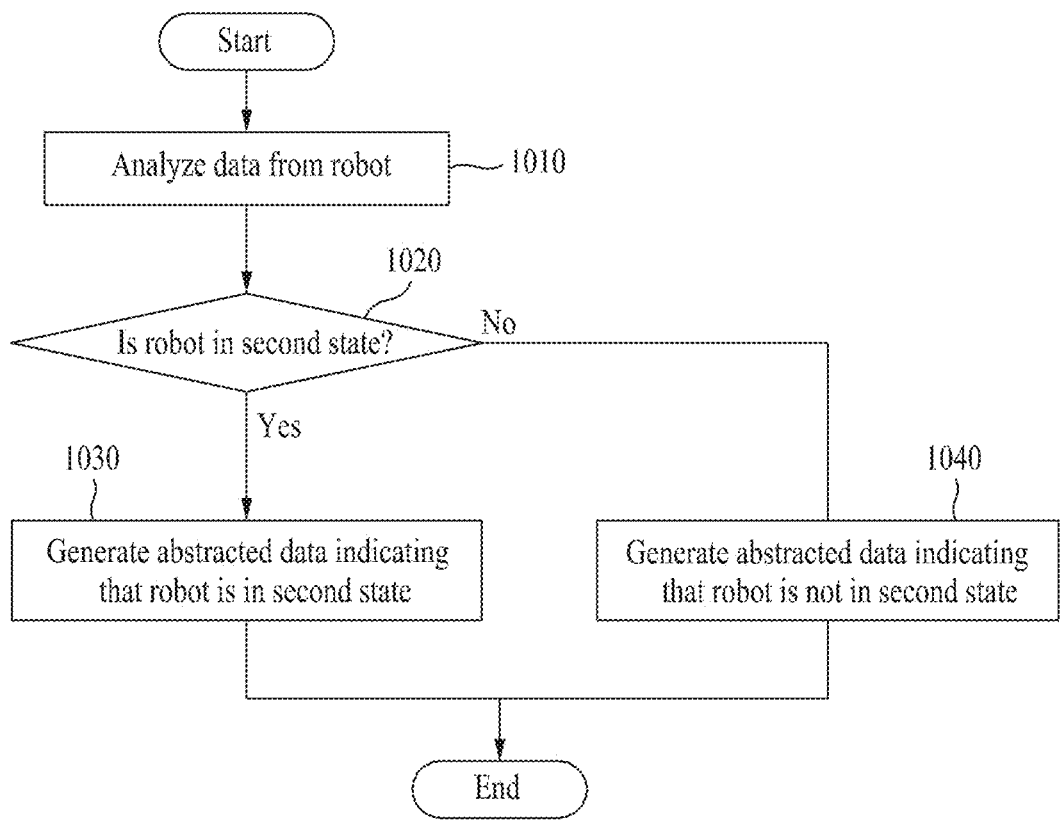

FIGS. 9 and 10 are flowcharts illustrating examples of a method of processing data from a robot and generating and processing abstracted data based on corresponding data according to at least one example embodiment.

Hereinafter, a method of processing, by the cloud server 120, data from the robot 100 is described with reference to FIG. 9.

Referring to FIG. 9, in operation 905, the cloud server 120 may receive, from the robot 100, data collected by the robot 100 (e.g., data related to control of the robot 100). The data related to control of the robot 100 may be data collected by the robot 100 according to a driving, a function performing, or a service operation of the robot 100. For example, the data related to control of the robot 100 may include at least one of time information, velocity, position, and battery information of the robot 100, and image information captured through a camera as data collected by the sensor unit 106. Also, the data related to control of the robot 100 may include data indicating whether to operate the UX-related component 105, such as whether to turn ON or OFF an LED, whether to output sound, and whether to open or close a door of the robot 100.

In operation 910, the cloud server 120 may determine whether the data from the robot 100 includes bypass target data.

In operation 915, the cloud server 120 may immediately transfer (route) the bypass target data in the data from the robot 100 to the service application 110. The bypass target data may include data that indicates a first state of the robot 100. The first state may indicate a simple state of the robot 100 that may be verified from the corresponding data itself without analyzing or processing the data. Alternatively, the first state may indicate a state of the robot 100 that is required to be identified in real time by the service application 110.

The first state may include, for example, a battery state, a velocity state, a door open/close state, an LED ON/OFF state, and a sound output state of the robot 100, and data indicating the first state may include battery data, velocity data, data related to open/close of the door, data related to ON/OFF of the LED, and sound output data of the robot 100.

In operation 920, the data indicating the first state of the robot 100 may be immediately transferred to the service application 110 and the first state of the robot 100 may be identified by the service application 110. When the first state of the robot 100 is identified, the service application 110 may generate monitoring information about the robot 100. The monitoring information may be displayed/output through the apparatus 500.

In operation 925, the cloud server 120 may generate abstracted data by analyzing the data from the robot 100. The cloud server 120 may generate the abstracted data by analyzing data that does not correspond to the bypass target data in the data from the robot 100 or the data from the robot 100 that includes the bypass target data. "Abstraction of data" may refer to generating processed data by analyzing raw data. For example, the abstracted data may be data indicating whether the robot 100 corresponds to a specific state based on a result of determining whether the robot 100 is in the specific state by analyzing the data from the robot 100.

In this regard, a method of generating abstracted data is further described with reference to FIG. 10. The following operations 1010 to 1040 may be included in operation 925 of FIG. 9.

Referring to FIG. 10, in operation 1010, the cloud server 120 may analyze data from the robot 100.

In operation 1020, the cloud server 120 may determine whether the robot 100 is in a second state by analyzing the data from the robot 100.

In operation 1030, when the robot 100 is determined to be in the second state, the cloud server 120 may generate abstracted data indicating that the robot 100 is in the second state. Alternatively, in operation 1040, when the robot 100 is determined to not be in the second state, the cloud server 120 may generate abstracted data indicating that the robot 100 is not in the second state.

That is, the cloud server 120 may generate, as the abstracted data, information indicating whether the robot 100 is in the second state as a result of the determination.

In operation 930, the cloud server 120 may transmit the generated abstracted data to the service application 110.

The data from the robot 100 analyzed in operation 1010 may include the aforementioned data indicating the first state, alternatively/additionally, may include sensed data from the sensor unit 106. The second state may indicate a state of the robot 100 in which the robot 100 is determined to be as the cloud server 120 analyzes the data. For example, the second state may indicate whether providing of the service by the robot 100 is completed or not completed, whether providing of the service by the robot 100 is possible or impossible, or whether an operation of the robot 100 is normal or abnormal. That is, the second state may indicate the state of the robot 100 determined by the cloud server 120 based on the data from the robot 100.

In detail, when a position of the robot 100 is analyzed to not vary for a desired period of time or more, the cloud server 120 may generate abstracted data indicating that the robot 100 is stuck, that the robot 100 may not operate properly, or that providing of the service is impossible (or that it takes long time to provide the service).

In operation 935, the service application 110 may identify that the robot 100 is in the second state based on the received abstracted data.

In operation 940, the service application 110 may generate an instruction to control the robot 100 based on the received abstracted data (or as the second state of the robot 100 is identified. Alternatively/additionally, the service application 110 may generate monitoring information about the robot 100 based on the received abstracted data (or as the second state of the robot 100 is identified).

The monitoring information may be information indicating the first state and/or the second state of the robot 100. The monitoring information may be displayed/output through the apparatus 500.

The instruction transmitted to the cloud server 120 in operation 940 may correspond to the abstracted instruction described above with reference to operation 610 of FIG. 6. Although not illustrated, even when the first state is identified, the service application 110 may generate an instruction to control the robot 100.

Description related to technical features made above with reference to FIGS. 1 to 8, 12, and 13 may apply to FIGS. 9 and 10 as is and thus, further description related thereto is omitted.

Figure 11:
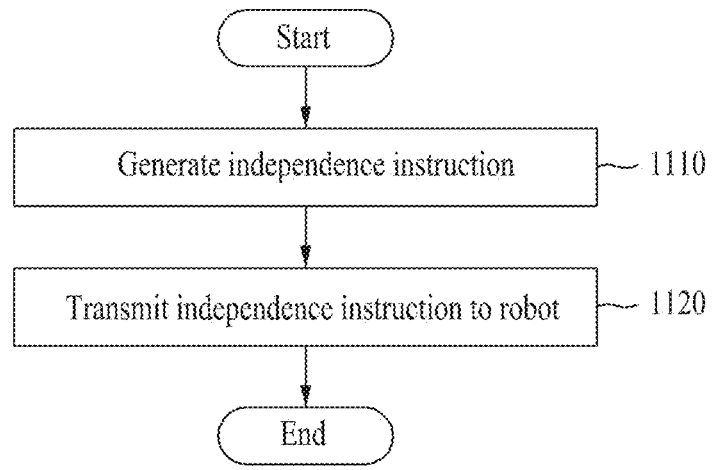
FIG. 11 is a flowchart illustrating an example of a method of generating and processing an independence instruction independently provided to a robot from a cloud server side according to at least one example embodiment.

FIG. 11 is a flowchart illustrating an example of a method of generating and processing an independence instruction independently provided to a robot from a cloud server according to at least one example embodiment.

Referring to FIG. 11, in operation 1110, the cloud server 120 may generate an independence instruction to control the robot 100 independently from an instruction (e.g., an abstracted instruction) from the service application 110.

In operation 1120, the cloud server 120 may transmit the independence instruction to the robot 100 or another robot.

The independence instruction may be an instruction generated by the cloud server 120 to control the robot 100, regardless of the service application 110. The independence instruction is related to an operation and function performance of the robot 100, but may be an instruction related to performing an independent operation and function for the service provided from the robot 100.

For example, the independence instruction may include an instruction to request the robot 100 for charging (e.g., an instruction to move to a position in the space), an instruction to update a movement path of the robot 100 to a specific point (e.g., an instruction to update a path to a destination or a specific waypoint (a driving recovery instruction)), or an instruction to request another robot to provide a corresponding service when the robot 100 is unable to provide the service.

Also, when the cloud server 120 controls a plurality of robots, an instruction related to a resource management, such as switching a specific robot providing a service to provide another service or replacing robots providing a service with other robots may be regarded as the independence instruction.

Description related to technical features made above with reference to FIGS. 1 to 10, 12, and 13 may apply to FIG. 11 as is and thus, further description related thereto is omitted.

Figure 14:
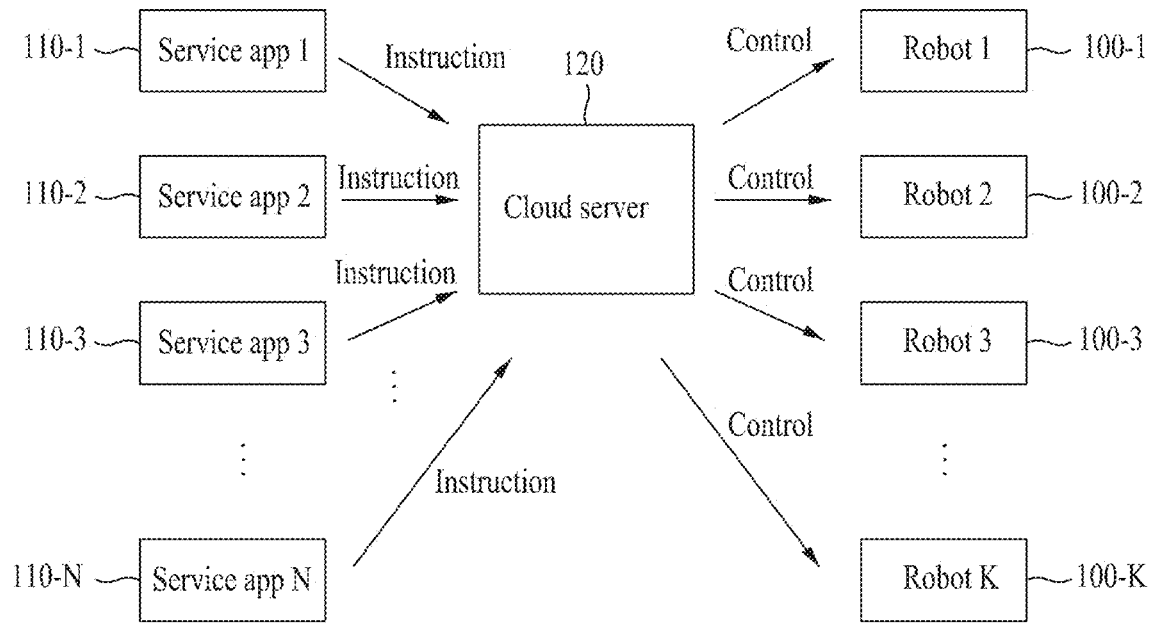
FIG. 14 illustrates an example of an N:1:K relationship among a service application, a cloud server, and a robot according to at least one example embodiment.

FIG. 14 illustrates an example of an N:1:K relationship among a service application, a cloud server, and a robot according to at least one example embodiment.

Referring to FIG. 14, the service application 110 may include a plurality of service applications 110-1 to 110-N. Each of the service applications 110-1 to 110-N may be configured such that each different robot 100 may provide a service. Here, N denotes a natural number of 2 or more. The cloud server 120 may receive an abstracted instruction from each of the service applications 110-1 to 110-N and may control the robot 100 to perform an operation corresponding to the received abstracted instruction.

Referring to FIG. 14, the robot 100 may include a plurality of robots 100-1 to 100-K. Each of the robots 100-1 to 100-K may be configured to provide at least one of services provided from the service applications 110-1 to 110-N. The robots 100-1 to 100-K may be mapped to the service applications 110-1 to 110-N based on a relationship of 1:many or many:1. That is, the plurality of robots 100-1 to 100-K may be controlled by a single service application and a single robot may be configured to provide services related to the plurality of service applications 110-1 to 110-N.

For example, each of the robots 100-1 to 100-K may be configured such that at least one of the service applications 110-1 to 110-N is plugged into a corresponding robot and the corresponding robot provides a service in connection with the plugged service application. That is, as the service application 110 is plugged into the robot 100, the robot 100 may be configured to provide a service related to the service application 110 in connection with the service application 110.

The cloud server 120 may control another service application among the plurality of service applications 110-1 to 110-N to be plugged into the robot 100, such that the robot 100 may provide a different service in connection with the other service application.

According to example embodiments, it is possible to switch the robot 100 configured to provide a single service to the robot 100 configured to provide another service (or additionally provide another service). That is, providing of a service by the robot 100 may be easily expanded.

Description related to technical features made above with reference to FIGS. 1 to 13 may apply to FIG. 14 as is and thus, further description related thereto is omitted.

Figure 15:
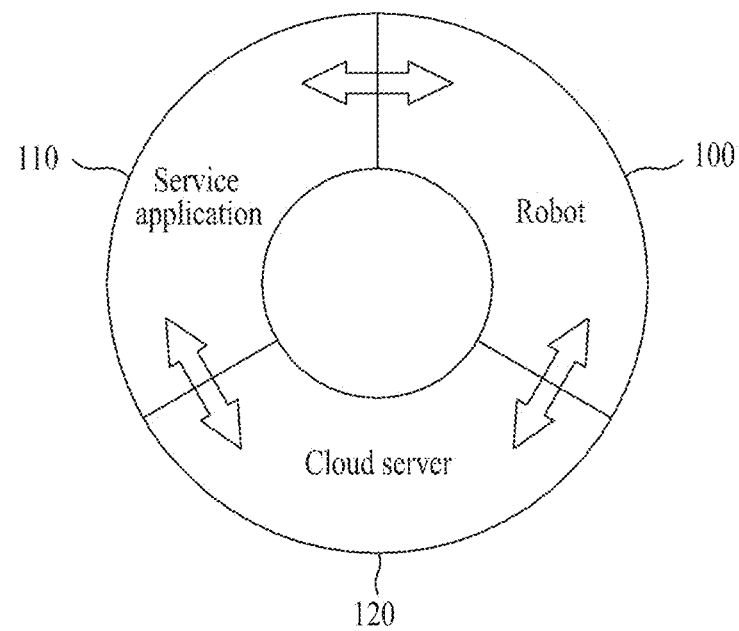
FIG. 15 illustrates an example of a relationship among a service application, a cloud server, and a robot in terms of a data flow according to at least one example embodiment.

FIG. 15 illustrates an example of a relationship among a service application, a cloud server, and a robot in terms of a data flow according to at least one example embodiment.

In terms of a data flow, the cloud server 120, the robot 100, and the service application 110 may be connected to each other.

Although the robot 100 and the service application 110 communicate an instruction and data through the cloud server 120, a bypass target instruction and bypass target data may be transferred as is between the robot 100 and the service application 110. Therefore, in terms of the data flow, the cloud server 120, the robot 100, and the service application 110 may be regarded to be interconnected.

Description related to technical features made above with reference to FIGS. 1 to 14 may apply to FIG. 15 as is and thus, further description related thereto is omitted.

The systems or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be specified permanently or temporarily in any type of machine, component, physical equipment, virtual equipment, computer record medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and record media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method of operating a cloud server to control a robot providing a service in connection with a service application, the method comprising:
receiving, at the cloud server, an instruction to provide the service from the service application;
determining whether the received instruction is a bypass target instruction, the bypass target instruction being an instruction that is transferred from the service application to the robot via the cloud server without being processed by the cloud server; and
in response to the received instruction not being a bypass target instruction,
dividing, at the cloud server, the received instruction into a plurality of unit instructions;
generating, at the cloud server, a plurality of sub-instructions, the plurality of sub-instructions corresponding to the plurality of unit instructions of the received instruction; and
sequentially transmitting each sub-instruction, from among the plurality of sub-instructions, from the cloud server to the robot,
wherein the plurality of sub-instructions are instructions for controlling the robot, and
wherein the received instruction is an abstracted instruction incapable of directly controlling the robot to provide the service while each sub-instruction, from among the plurality of sub-instructions, is an instruction that is capable of directly controlling the robot.

2. The method of claim 1, further comprising:
immediately transferring the received instruction to the robot, when the received instruction is the bypass target instruction,
wherein the robot is controlled based on the bypass target instruction.

3. The method of claim 2, wherein the bypass target instruction is an instruction to control a user experience (UX)-related component of the robot.

4. The method of claim 1,
wherein the received instruction is an instruction to move the robot to a destination, and
wherein the generating, at the cloud server, the plurality of sub-instructions comprises:
determining a plurality of waypoints through which the robot is to move from a current position of the robot to the destination;
determining coordinates of the plurality of waypoints; and
generating each sub-instruction of the plurality of sub-instructions as an instruction to move the robot from a current coordinate to a next coordinate of the coordinates of the plurality of waypoints, and
wherein the sub-instructions cause the robot to move to the destination by moving through the plurality of waypoints.

5. The method of claim 1, wherein the sequentially transmitting of each sub-instruction, from among the plurality of sub-instructions, comprises:
transmitting a first sub-instruction among the plurality of sub-instructions to the robot from the cloud server;
receiving a completion report at the cloud server from the robot after control of the robot according to the first sub-instruction is completed; and
transmitting a second sub-instruction successive to the first sub-instruction among the plurality of sub-instructions to the robot from the cloud server after receiving the completion report.

6. The method of claim 1, wherein the transmitting of each sub-instruction, from among the plurality of sub-instructions, comprises:
monitoring a state of the robot; and
transmitting, to the robot from the cloud server, a sub-instruction for providing the service by the robot among the sub-instructions or transmitting, to the robot from the cloud server, a cancellation instruction to cancel a previously transmitted sub-instruction, depending on the state of the robot.

7. The method of claim 1, further comprising:
receiving, from the robot, data associated with the robot;
determining, at the cloud server, whether the data associated with the robot includes bypass target data indicating a first state of the robot;
immediately transferring the bypass target data to the service application in response to the data associated with the robot including the bypass target data without processing the bypass target data with the cloud server; and
generating, at the cloud server, abstracted data based on data other than the bypass target data in the data associated with the robot, and transmitting the generated abstracted data from the cloud server to the service application,
wherein, based on the abstracted data, an instruction to control the robot is generated by the service application or monitoring information about the robot is generated by the service application, and
wherein, based on the bypass target data, the first state of the robot is identified in the service application.

8. The method of claim 7, wherein the generating, at the cloud server, the abstracted data comprises:
analyzing the data associated with the robot and determining whether the robot is in a second state; and
transmitting, to the service application, information regarding whether the robot is in the second state as the abstracted data, based on a result of the determining whether the robot is in the second state.

9. The method of claim 1,
wherein the robot is a first robot, and
wherein the method further comprises:
generating an independence instruction to control the first robot independently from the received instruction; and
transmitting the independence instruction to the first robot or a second robot,
wherein the independence instruction includes an instruction to require charging for the first robot, an instruction to update a travel path of the first robot to a specific point, or an instruction to request the second robot to provide the service when the first robot is unable to provide the service.

10. The method of claim 1,
wherein the service application is implemented on a server or a client separate from the robot through a network, and
each sub-instruction, from among the plurality of sub-instructions, that is transmitted to the robot does not include context information related to the service.

11. The method of claim 10,
wherein the service application is a first service application from among a plurality of service applications, wherein, the first service application is an application that, when plugged into the robot, configures the robot to provide the service in connection with the first service application, and wherein the cloud server allows a second service application, from among the plurality of service applications, to be plugged into the robot and controls the robot to provide another service in connection with the second service application.

12. The method of claim 10, further comprising:
setting different security policies for the service application, the cloud server, and the robot.

13. The method of claim 1, wherein the determining comprises determining an instruction transferred from the service application for controlling a user experience (UX)-related component of the robot including at least one LED or a sound output device of the robot as the bypass target instruction.

14. A method of controlling a robot providing a service in connection with a cloud server and a service application, the method comprising:
sequentially receiving, at the robot from the cloud server, a plurality of instructions, each instruction of the plurality of instructions being a bypass target instruction or a sub-instruction, each bypass target instruction being an instruction that is transferred from the service application to the robot via the cloud server without being processed by the cloud server and each sub-instruction being generated based on an instruction received by the cloud server from the service application to provide the service, the instruction received by the cloud server being divided by the cloud server into a plurality of unit instructions used to generate a plurality of sub-instructions received at the robot from the cloud server; and
controlling the robot based on each of the received plurality of instructions,
wherein the service application is implemented on a server or a client separate from the robot through a network,
wherein the instruction to provide the service is an abstracted instruction incapable of directly controlling the robot to provide the service,
wherein each sub-instruction, from among the plurality of sub-instructions, is an instruction that is capable of directly controlling the robot, and
wherein each sub-instruction, from among the plurality of sub-instructions, that is transmitted to the robot does not include context information related to the service.

15. The method of claim 14, further comprising:
collecting data related to control of the robot; and
transmitting the collected data to the cloud server,
wherein the data transmitted to the cloud server is analyzed by the cloud server, processed as abstracted data, and transmitted to the service application, and
wherein, based on the abstracted data, an instruction to control the robot is generated by the service application or information indicating monitoring information about the robot is generated by the service application.

16. The method of claim 14,
wherein the service application is a first service application from among a plurality of service applications,
wherein, the first service application is an application that, when plugged into the robot, configures the robot to provide the service in connection with the first service application, and
the plurality of service applications includes a second service application, different from the first service application, that, when plugged into the robot by the cloud server, controls the robot to provide another service in connection with the second service application.

17. The method of claim 7, wherein
the first state is at least one of a battery state, a velocity state, a door open/close state, an LED ON/OFF state, or a sound output state of the robot, and
the bypass target data includes at least one of battery data, velocity data, data related to door open/close, data related to the LED ON/OFF state, or sound output data of the robot.

18. A cloud server to control a robot providing a service in connection with a service application, the cloud server comprising:
memory storing computer-executable instructions; and
at least one processor configured to execute the computer-executable instructions such that the processor is configured to,
receive an instruction to provide the service from the service application,
determine whether the received instruction is a bypass target instruction, the bypass target instruction being an instruction that is transferred from the service application to the robot via the cloud server without being processed by the cloud server, and
in response to the received instruction not being a bypass target instruction,
divide the received instruction into a plurality of unit instructions,
generate a plurality of sub-instructions, the plurality of sub-instructions corresponding to the plurality of unit instructions of the received instruction, and
sequentially transmit each sub-instruction from among the plurality of sub-instructions to the robot, and
wherein each sub-instruction, from among the plurality of sub-instructions, is an instruction for controlling the robot and
wherein the received instruction is an abstracted instruction incapable of directly controlling the robot to provide the service while each sub-instruction, from among the plurality of sub-instructions is an instruction that is capable of directly controlling the robot.

* * * * *